United States Patent [19]

Antonelli

[11] Patent Number: 5,515,943
[45] Date of Patent: May 14, 1996

[54] TREE STAND AND METHOD FOR THE INSTALLATION THEREOF

[76] Inventor: Barry D. Antonelli, 4805 Cheshire Rd., Doylestown, Pa. 18901

[21] Appl. No.: 415,931

[22] Filed: Mar. 9, 1995

[51] Int. Cl.$^6$ ................................................. A01M 31/02
[52] U.S. Cl. ........................................... 182/187; 108/152
[58] Field of Search ............................. 182/187, 188, 182/116, 136; 108/152

[56] References Cited

U.S. PATENT DOCUMENTS

| | | | |
|---|---|---|---|
| 4,782,918 | 11/1988 | Brunner | 182/187 |
| 5,409,083 | 4/1995 | Thompson | 182/187 |

Primary Examiner—Alvin C. Chin-Shue

[57] ABSTRACT

A tree stand is disclosed which is comprised of an elongated bracket section for securing tree stand to a tree trunk and a platform section which is manually detachable from the bracket section. The method of installing the tree stand is to initially secure the bracket section to a tree and then attach the platform section to the bracket section. In a preferred embodiment of this invention a means for securing the bracket section to a tree, such as a belt or chain, is attached immediately adjacent the upper terminal end of bracket section to allow the length of the bracket section to be used as a lever for tightening the bracket section to a tree.

7 Claims, 2 Drawing Sheets

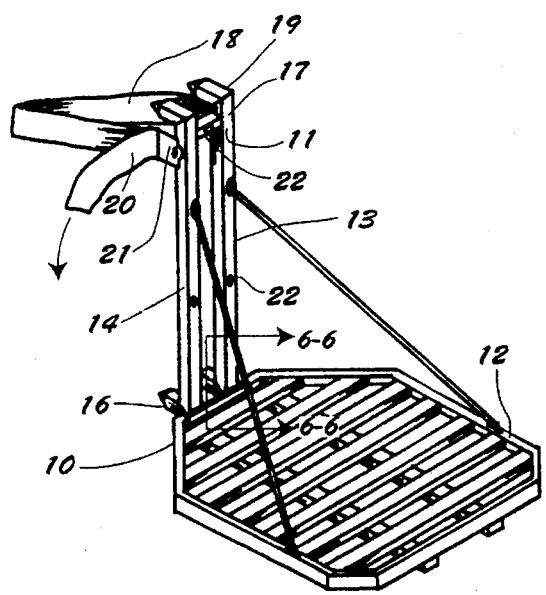
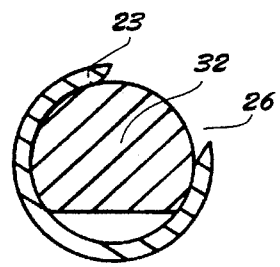
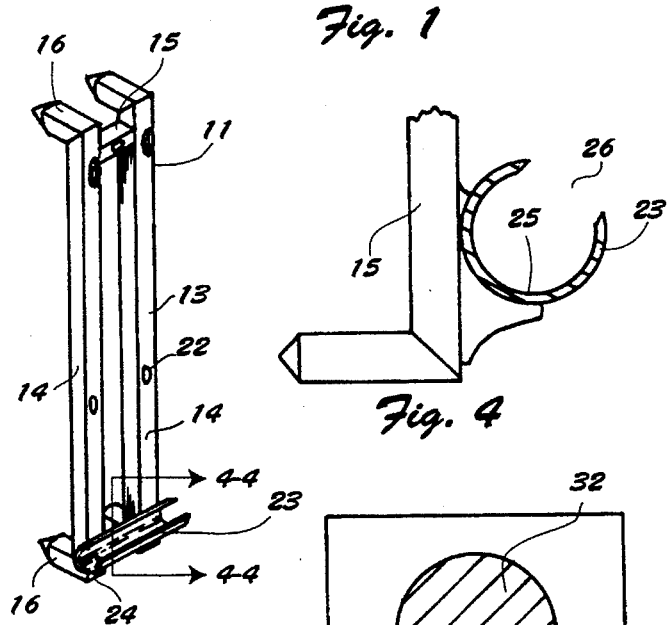
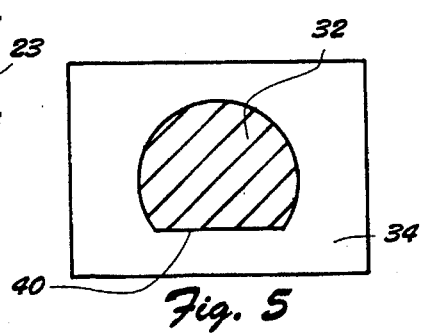
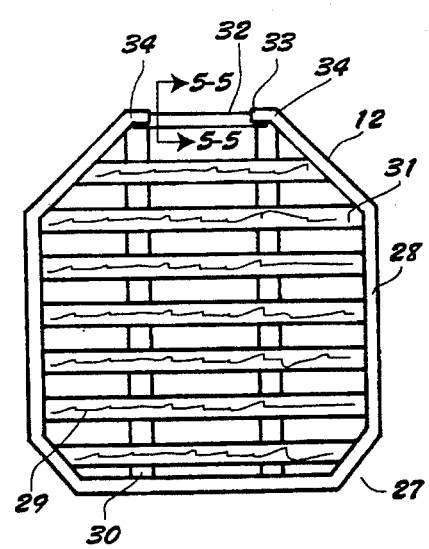

TREE STAND AND METHOD FOR THE INSTALLATION THEREOF

BACKGROUND OF THE INVENTION

1. Field of the Invention

This invention relates to a tree stand for supporting a person at an elevated height while hunting large game. More particularly this invention is concerned a novel tree stand having unique features and the method for installation of the tree stand which make it more convenient to carry, simpler to install and safer to use than the tree stands heretofore available.

2. Description of the Related Prior Art

Large game animals, such as deer and elk, have excellent senses and in particular eyesight. Large animals can see a hunter standing on the ground or walking through the woods long before the hunter ever sees the animals and will move away to avoid the hunter. The animals look at eye level and down and generally will not look up. Hunters, aware of this behavior, locate tree stands above the line of sight of the animals to avoid being seen by the animals.

Hunters carry the tree stands into the woods which makes the weight of the tree stands an important factor. After the hunter reaches the area where he intends to hunt, the hunter climbs a suitable tree and attaches the tree stand to the trunk of the tree. The installation of the tree stand can both difficult and dangerous as the hunter not only has to climb the tree but must also bring up the tree stand and attach it to the tree. The weight and overall dimensions of the tree stands are important factors as it is difficult for a hunter to a hold heavy, bulky tree stand while attempting to attach it to the tree and at the same time keeping his own balance. As a result hunters are often injured while installing tree stands. The method used to secure a tree stand to a tree is likewise important. If the tree stand is difficult to secure to a tree the work and danger involved is also increased. In addition the method of securing the tree stand is important as the tree stand must safely support a hunter standing on the tree stand.

An additional factor to be considered with respect to tree stands is the hunting method to be used. Large game animals, such as deer, have regular patterns of daily travel providing they do not sense danger. In the early hours just before dawn and a few hours thereafter large game animals tend to travel certain trails, rest during the day and then return on other trails in the hours just before dark. Hunters, aware of these trails, located their tree stands above the trails. Since the large animal travel different trails in the early morning hours than in the evening hours, many hunters use tree stands in each location to improve their chance of getting an animal. If the hunter has only a single tree stand the hunter must install the tree stand at the first location, use it for early morning hunting, then take it down, carry it to the second location and reinstall at the second location. The use of two conventional tree stands in this manner has a number of disadvantages. There is considerable work involved in installing and removing most tree stands and carrying them from location to location. In addition the installation of a tree stand in the darkness before dawn for the morning hunting is very dangerous and the noise involved can warn animals to avoid the area. The required installation for the evening hour hunting can likewise frighten the animals and the removal of the tree stand in the dark after the day's hunting can be very dangerous especially if the hunter is tired. If the hunter is hunting in the same area for a number of days the work involved each day can be very tiring and take the pleasure from hunting.

One of the methods used to overcome the problems involved when hunting at different locations is to use a number of tree stands and install one at each location. This solves the problems involved in moving a single tree stand from location to location each day but has it has serious drawbacks. Initially there is the cost involved in purchasing the additional tree stands. Then there is the problem that the hunter must carry two or more tree stands into the woods which doubles or triples the weight problem. Finally, and unfortunately, if a hunter installs tree stands at several location locations other hunters seeing an unattended tree stand will steal the tree stand. Besides the cost involved in replacing the stolen tree stand, the loss of the tree stand can ruin a hunting trip as tree stands cannot readily be replaced in most hunting areas.

The above desired properties and problems concerning tree stands are well known to those skilled in the art. Perhaps because hunting is a very popular sport, many suggestions have been made both in the patent art and the published literature in magazines and hunting supply catalogs for the design and construction of tree stands. The most commonly used tree stands disclosed in the prior art are called hanging tree stands. The hanging tree stands typically have a bracket which is designed to be secured to a tree trunk with a strap or chain and a platform for the hunter to stand on while hunting. The prior art hanging tree stands have the bracket section and the platform section permanently hinged together to allow the stand to be to folded flat for carrying into the woods and then folded open for in use.

The available hanging tree stands are relatively heavy. If a hunter wants to use several tree stands, as noted above, he must carry two or three complete tree stands. The tree stands, even in the folded state, are also difficult to install. The platforms must be relatively large to have sufficient area for a hunter to safely stand on. As a result the overall dimensions and the weight, the known types of tree stands are very difficult to hold and work around while being attached it to a tree trunk.

The methods used heretofore to secure tree stands to trees have not been completely satisfactory. The most commonly used method is to use a strap or a chain having one end permanently attached to one side of the support bracket, passing the strap around a tree trunk and then connecting the other end of the strap or chain to the clamp or hook on the other side of the bracket. The strap or chain is then tightened by hand. The strap or chain loosens when weight is applied to the platform because of the belt or chain stretching or the like. The bracket of the tree stand is not held flat and tight against the tree trunk which allows the entire tree stand to move when a person is standing on it. This makes the tree stand unstable to stand on and can allow the tree stand to "walk" down the tree with the hunter standing on it which is very dangerous.

What would be highly desirable would be a tree stand that is easier and safer to install, will remain tightly secured to a tree when in use, does not require carrying and installing multiple tree stands when hunting in several different locations and which is less likely to be stolen if left unattended in the woods.

SUMMARY OF THE INVENTION

A tree stand is disclosed which is comprised of an elongated bracket section for securing the tree stand to a tree trunk and a platform section which is manually detachable from the bracket section. The method of installing the tree stand is to initially secure the bracket section to a tree and then attach the platform section to the bracket section. In a preferred embodiment of this invention a means for securing the bracket section to a tree, such as a belt or chain, is attached immediately adjacent to the upper terminal end of bracket section to allow the length of the bracket section to be used as a lever for tightening the bracket section to a tree.

BRIEF DESCRIPTION OF THE DRAWINGS

FIG. 1 is an isometric illustration of the assembled tree stand of this invention.

FIG. 2 is an isometric illustration of the bracket section of the tree stand of this invention shown in FIG. 1.

FIG. 3 is a top plan view of the platform section of the tree stand of this invention shown in FIG. 1.

FIG. 4 is a cross sectional illustration taken as indicated by the lines and arrows 4—4 on FIG. 2.

FIG. 5 is a cross sectional view taken as indicated by the lines and arrows 5—5 on FIG. 3

FIG. 6 is a cross sectional illustration taken as indicated by the lines and arrow 6—6 on FIG. 1.

DETAILED DESCRIPTION OF THE PREFERRED EMBODIMENTS

Figure 7:
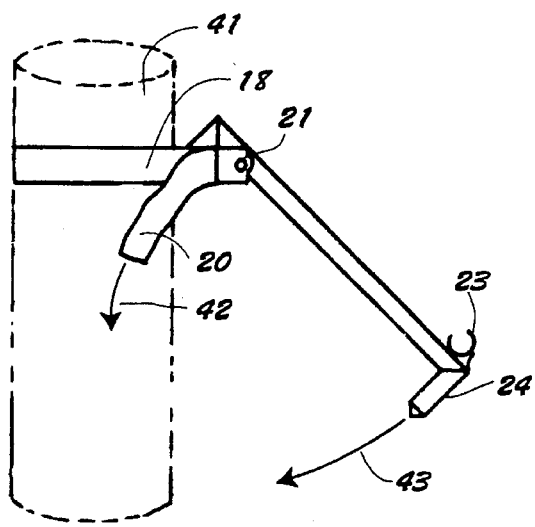
FIG. 7 is a schematic illustration of the first step used for the installation of the tree stand in accordance with this invention.

In FIG. 1 there is an illustration of the preferred embodiment of the tree stand 10 of this invention. The tree stand 10 is comprised of a bracket section 11 and a manually detachable platform section 12. The term "manually detachable" as used hereinafter in the specification and claims is to be understood to mean that the bracket section 11 and the platform section 12 can be detached from each other by hand without the use of tools.

The bracket section 11 and the platform section 12 can be made of the same or different materials. The most important consideration used in the selection of the material is the strength of the material in that the assembled tree stand must safely support a hunter at an elevated position above the ground. An additional consideration is the relative weight of the material in that the hunter must carry the tree stand 10 into the woods and then lift the tree stand 10 up a tree to install it. Materials which have been found particularly useful include high strength tubular aluminum which can be welded together to form the tree stand 10 and glass fiber reenforced plastic which can be molded to form the tree stand 10. Aluminum has the advantage that is relatively lighter than the reenforced plastic for the same strength but being metal can create more noise in use and must be painted to camouflage it. Once the required molds are prepared, fiber reenforced plastic, can more readily and less expensively be molded into the required parts, is inherently quieter in use and the desired camouflage color can be molded in to the parts.

The bracket section 11 as shown in FIGS. 1 and 2 is comprised of an elongated rectangular frame portion 13 comprised spaced apart lengthwise members 14 and relatively shorter crosswise member 15 connecting the lengthwise members 14 together to form the frame 13. Short legs, hereinafter referred to as standoffs 16, are at each of the corners of the frame 13. The standoffs 16 extend perpendicular to and inwardly from the rectangular frame 13. The standoffs 13 allow the flat bracket 11 section to be held against solidly against the round trunk of a tree.

Immediately adjacent to the upper terminal end 17 of the frame 13 a nylon web belt 18 is shown which has one end 19 permanently secured to the frame 13 and the opposite end 20 secured to the opposite side of the frame 13 with an adjustable clamp 21. The web belt 18 is used to secure the bracket section 11 to a tree. A web belt 18 as shown is preferably used for this purpose because of its light weight and exceptional strength and durability. It is also possible to use other material than web belting such a chain or cable to attach the bracket section 11 to a tree. Furthermore when it is desired to permanently mount the bracket section 11 to a tree in areas where this is permitted, the bracket 11 can be secured to a tree with permanent fasteners such a lag bolts inserted through apertures 22 in the bracket section for this purpose.

The frame 13 has a slotted tubular member 23 extending across the entire width at the lower terminal end 24. The slotted tubular member 23, as seen in FIG. 4, has a circular inner diameter wall 25 except for the opening created by the slot 26. The function of the slot 26 will be explained below.

The platform section 12 is shown in FIG. 3. As illustrated the platform section 12 is hexagonal in shape. This shape has been found to provide the greatest amount of usable standing area at the lowest weight. The elimination of the corner area 27 to form the hexagonal shape lightens the platform section without reducing the useful standing area as persons do not normally stand on the corner areas when using the tree stand. The platform section 12 has a hexagonal outer frame 28 with cross members 29 extending between the outer frame 28 and support beams 30 positioned below the cross members 29 to provided additional strength to the platform. A nonskid surface 31 is applied to upper surface area of the platform. The above described construction provides excellent strength at relative low weight and allow water to drain from the surface of the platform. The platform section 12 can of other shapes than hexagonal including round, square or rectangular and the support area can be solid, honeycombed or the like.

A solid shaft 32 is spaced apart from and secured along one side 33 of the platform section 12 with by stop blocks 34 at the opposite terminal ends of the shaft 32. The shaft 32 is solid and has round cross section with the exception of a flat 40 extending along the entire length of the shaft 32. The shaft 32 and the tubular member 23 of the bracket section 11 have mating cross sections which allow the bracket section 11 and the platform section 12 to hinge together without the use of tools. The platform section 12 is secured to the bracket section 11 by initially aligning the platform section 12 parallel to the bracket section 11 and moving it downwardly with flat area 40 on the shaft 32 aligned with the slot 26 in the tubular member 23 of the bracket section 11 until it passes through the slot 26 into the interior of the tubular member 23. After the shaft 32 is inserted into the tubular member 23 the platform section 12 is rotated to a position which is substantially perpendicular to the bracket section 11. The slotted tubular member 23 and shaft 32 with the flat 40 allow the platform section 12 to be attached to the bracket section 11. The relationship of the slotted tubular member 23 and the shaft 32 in the assembled position is best seen in FIG. 6 taken as indicated by the line and arrows 6—6 on FIG. 1. The stop blocks 34 at each end of the shaft 32 limit the horizontal movement of the platform section 12 relative to the bracket section 11. The female section is preferably made sightly smaller in diameter than the male section to obtain a tight fit of the hinge parts and eliminate noise and relative movement. The flat on the male section and the slot on the female section allow the male section to be easily inserted into the female section. Then, when the male section rotated to the locked position, it forces the female section into a interference fit locking the pans together eliminating rotational and sidewards movement.

The use of a hinge comprised of the slotted tubular member 23 and the shaft 32 with the mating fiat 40 is the preferred method for manually attaching the platform section 12 to the bracket section 11. The assembly of the tree stand does not require the use of tools and there are no loose parts. It is also possible to use other methods for manually securing the platform section and the bracket section together. These methods include providing the bracket section and the platform section with interlocking sections similar to a door hinge and using a separate removable pin to hold the pans together.

Figure 8:
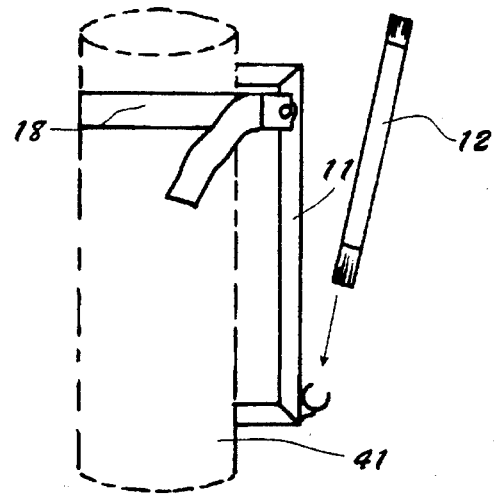
FIG. 8 is a schematic illustration of the second step used for the installation of the tree stand of this invention.
Figure 9:
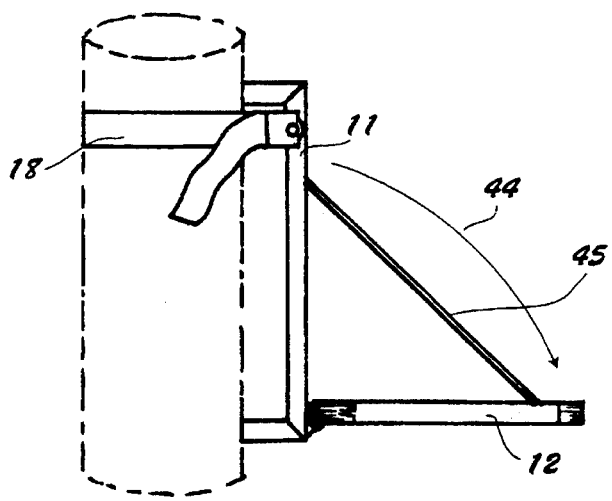
FIG. 9 is a schematic illustration of the third step and final step used in the installation of the tree stand.

The tree stand 10 of this invention can be attached to a tree trunk in a few simple steps as schematically shown in FIGS. 7, 8 and 9. The tree stand 10 is separated into the bracket section 11 and the platform section 12. The bracket section 11 is carried up a tree 41 shown in dotted line to the desired height. The belt 18 is passed around the tree 41 and secured with the clamp 21 and the belt 18 is drawn tight by pulling the end of the belt as indicated by the arrow 42 on FIG. 7. The bracket section 11 is allowed to pivot outwardly from the tree 41 shown in FIG. 7. This allows the contact point the belt 18 to be somewhat closer to the tree 41 than the length of the standoffs 16. The lower terminal end 24 of the bracket section 11 is then drawn toward the tree trunk as indicated by the arrow 43 on FIG. 7. The slotted tubular member 23 functions as a handle for this purpose. As the bracket section 11 is drawn toward the tree 41 and it passes over the pivot point at which the belt 18 is secured to the bracket section 11 causing the entire bracket section 11 to be forced inwardly and the lower terminal end to snap lock against the tree 41. The belt 18 is tightened to a much greater degree in this manner than is possible by hand tighten the belt as described above. The fact that the platform section 11 is detached from the bracket section 12 allows the length of the bracket section 11 to be used as a lever. The step of attaching the bracket section 11 to a tree 41 in this manner takes less than a minute.

The second step in the mounting process consisting of securing the platform section 12 to the bracket section 11. The platform section 12 is brought up into the tree 41. The platform section 12 section is aligned adjacent to and parallel to the bracket section 11 and lowered into position where the shaft 32 having the flat 40 engages the slotted tube 23. The platform section 12 is then folded down as shown by the arrow 44 on FIG. 9. The assembly is completed by connecting cables 45 between the bracket section 11 and the platform section 12 as shown in FIG. 9. The tree stand 10 is now readily for use. The entire mounting procedure can be completed in at most a few minutes. The tree stand 10 can be removed in the same amount of time by reversing the above installation steps.

The tree stand 10 of this invention has many advantages compared to the tree stands disclosed in the prior art. The bracket section 11 weighs less than half the weight of the complete tree stand. The bracket section 11 being lighter and being long and narrow is easier to handle than conventional tree stands. After the bracket section 11 is attached to a tree it is relatively simply to manually attach the platform section 12 as the amount of weight which must be handle is significantly less the completely assembled tree stands used heretofore.

An additional important advantage of the tree stand 10 of this invention is that when hunters hunt in different locations as noted above, it is only necessary to purchase an additional bracket section 11 for each location as the same platform section can be used at all the locations. This reduces the initial cost of the equipment as compared to purchasing a complete stand for each location or moving tree stands from location to location. Furthermore since only one platform is required when using multiple hunting stations the weight of the equipment which must be carried into the woods is corresponding less.

The tree stand 10 of this invention has the further advantage that there is less chance of an unattended tree stand being stolen by other hunters. When the bracket by itself is left on a tree it is much harder to see than a complete tree stand. It can only be seen from the side of the tree on which it is attached. If the bracket section is camouflaged it is even less visible. Then even if the bracket section 11 is observed on a tree it is less likely to be stolen. The bracket section 11 by itself without the required platform section is useless and accordingly not worth stealing and carrying from the woods.

Figure 10:
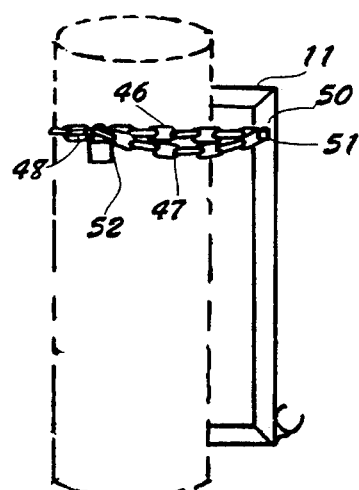
FIG. 10 is an illustration showing the use of a chain in stead of a bellt to secure the tree stand to a tree.

The tree stand can further be protected from be stolen as shown in FIG. 10. A chain 46 is used in place of a belt to secure the bracket section 11 ot the tree stand to a tree. The chain 46 that is used has a length which is suffient long to pass around a tree on which it is to mounted and have an additional length 47 to overlay the section 48 of the chain on the tree. The tree stand is locked to a tree by passing the chain about a tree and tightly securing a link 50 of the chain 46 to a hook 51 on the bracket section 11. The additional length of the chain 47 is locked to the chain on the tree with a pad lock 52.

Various modifications and additions can be made to the tree stand 10 of the invention besides those noted above. A seat can be attached to the tree stand 10 for a hunter to use while waiting for game. Hooks can be provided for holding equipment such as guns and field glasses. A bag can also be attached for holding loose equipment such safety harness and the like. As noted above a chain can be used in place of a belt. The chain can be of a sufficient length to pass completely around a tree trunk and the bracket section 11. The excess length of chain can then be locked to the chain on the tree bracket to further protect the tree stand from being stolen when unattended.

Other modifications in the size and shape of the tree stand which will be obvious once having been made aware of the above described invention are included within the spirit and scope of the subjoined claims.

What is claimed is:

1. A tree stand comprising in combination a bracket section and a platform section;

(a) said bracket section having an elongated frame having an upper terminal end and a lower terminal end and stand offs for spacing the frame from a tree, attaching means secured adjacent the upper terminal end for securing the bracket section to a tree and a first section of a locking means adjacent the lower terminal end; said first section of the locking means being an elongated tubular member with a round inner diameter and having an upwardly opening slot of a given width extending the length thereof;

(b) said platform section having an outer edge and a second section of the locking means at said outer edge; said second section of locking means being an elongated shaft having a round cross section having an outer diameter that mates with the inner diameter of the tubular member and having a flat of a given width extending the length thereof; said given width of the slot and said given width of the flat being selected to allow the shaft, when the flat of the shaft is aligned with the slot, to be inserted downwardly into the tubular member and thereafter be rotated out of alignment to lock the bracket section to the platform section;

said first and second section of the locking means being cooperatively engagable with each other to lock the bracket section and the platform section together by downwardly inserting the second section of the locking means into the first section of the locking means and then rotating the platform section downwardly and away from the bracket section;

and said bracket section and platform section being manually releasable from each other to allow the bracket section and the platform section to be separated from each other.

2. The tree stand according to claim 1 wherein the attaching means is comprised of an elongated flexible member having first and second terminal ends and an adjustable clamp means, said first end of the flexible member being secured to one of the sides of the bracket section and said adjustable clamp being secured to the opposing side of the bracket section, said second terminal end of the flexible member being adjustably engaged with the clamp means.

3. The tree stand according to claim 2 wherein the elongated flexible member is a belt.

4. The tree stand according to claim 2 where the flexible member is a chain.

5. The tree stand according to claim 3 wherein the chain is of sufficient length to pass around a tree and be locked to itself at a point intermediate to the first and second terminal ends.

6. The tree stand according to claim 2 wherein standoffs are immediately adjacent the upper terminal end of the bracket section and the attaching means is secured to the bracket section at a given point below the position of the standoffs at the upper terminal end of the bracket section, said given point being selected so that when the standoffs are engaged with a tree and the attached means is secured about the tree the length of the bracket below the attaching means can be used as a lever to cam lock the bracket to the tree.

7. A tree stand comprising in combination a bracket section and a platform section;

(a) said bracket section having an elongated frame having an upper terminal end and a lower terminal end and stand offs for spacing the frame from a tree, attaching means secured adjacent the upper terminal end for securing the bracket section to a tree and a first section of a locking means adjacent the lower terminal end; said first section of the locking means being an elongated tubular member with a round inner diameter and having an upwardly opening slot of a given width extending the length thereof;

(b) said platform section having an outer edge and a second section of the locking means at said outer edge; said second section of locking means being an elongated shaft having a round cross section having an outer diameter slightly larger than the inner diameter of the tubular member, whereby when the shaft member is inserted into the tubular member and rotated the tubular member to expand and cause an interference fit of the shaft member and tubular member, said shaft further having a flat of a given width extending the length thereof; said given width of the slot and said given width of the flat being selected to allow the shaft when the flat of the shaft is aligned with the slot to be inserted downwardly into the tubular member and thereafter be rotated out of alignment to lock the bracket section to the platform section;

said first and second section of the locking means being cooperatively engagable with each other to lock the bracket section and the platform section together by downwardly inserting the second section of the locking means into the first section of the locking means and then rotating the platform section downwardly and away from the bracket section;

and said bracket section and platform section being manually releasable from each other to allow the bracket section and the platform section to be separated from each other.

* * * * *